US008848682B2

United States Patent
Guan et al.

(10) Patent No.: US 8,848,682 B2
(45) Date of Patent: Sep. 30, 2014

(54) METHOD FOR SUB-CHANNELIZATION AND RESOURCE MAPPING OF WIRELESS RESOURCES

(75) Inventors: Yanfeng Guan, Shenzhen (CN); Ying Liu, Shenzhen (CN); Hongyun Qu, Shenzhen (CN); Kaiying Lv, Shenzhen (CN); Rui Kang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 538 days.

(21) Appl. No.: 13/055,710

(22) PCT Filed: Jul. 24, 2009

(86) PCT No.: PCT/CN2009/072910
§ 371 (c)(1),
(2), (4) Date: Jan. 24, 2011

(87) PCT Pub. No.: WO2010/009679
PCT Pub. Date: Jan. 28, 2010

(65) Prior Publication Data
US 2011/0122860 A1    May 26, 2011

(30) Foreign Application Priority Data
Jul. 24, 2008  (CN) .......................... 2008 1 0133764

(51) Int. Cl.
*H04L 5/00* (2006.01)
*H04W 72/04* (2009.01)

(52) U.S. Cl.
CPC ............... *H04L 5/0044* (2013.01); *H04L 5/001* (2013.01); *H04W 72/0453* (2013.01); *H04L 5/0053* (2013.01); *H04L 5/003* (2013.01)

USPC ............ 370/343; 370/436; 370/468; 375/260

(58) Field of Classification Search
USPC ......... 370/208, 329, 330, 343, 344, 436, 437, 370/468; 375/260
See application file for complete search history.

(56) References Cited

U.S. PATENT DOCUMENTS 6,611,508 B1 *   8/2003   Abe ............................. 370/332
7,733,765 B2 *   6/2010   Suo et al. .................... 370/208

(Continued)

FOREIGN PATENT DOCUMENTS

CN         1960225 A      5/2007
CN       101043493 A      9/2007

(Continued)

OTHER PUBLICATIONS

International Search Report for International Application No. PCT/CN2009/072910, mailed Nov. 5, 2009.

(Continued)

*Primary Examiner* — Xavier Szewai Wong
*Assistant Examiner* — Natali N Pascual Peguero
(74) *Attorney, Agent, or Firm* — Clark & Elbing LLP

(57) ABSTRACT

A method for sub-channelization and resource mapping of wireless resources is provided. The method includes: according to bandwidth features or scheduling features supported by a wireless communication system, determining processes of sub-channelization and resource mapping of wireless resources or parameters of the processes. Therefore, the processes of sub-channelization and resource mapping of wireless resources or the parameters of the processes are different when the bandwidth features or scheduling features are different.

8 Claims, 11 Drawing Sheets

(56) References Cited

U.S. PATENT DOCUMENTS

| | | | |
|---|---|---|---|
| 7,768,973 B2* | 8/2010 | Zhu et al. | 370/329 |
| 7,916,623 B2* | 3/2011 | Kim et al. | 370/208 |
| 8,000,296 B2* | 8/2011 | Ofuji et al. | 370/330 |
| 8,054,767 B2* | 11/2011 | Choi et al. | 370/280 |
| 8,248,990 B2* | 8/2012 | Ofuji et al. | 370/326 |
| 8,305,999 B2* | 11/2012 | Palanki et al. | 370/335 |
| 2007/0133390 A1 | 6/2007 | Luo et al. | |
| 2008/0075032 A1* | 3/2008 | Balachandran et al. | 370/317 |
| 2008/0212698 A1 | 9/2008 | Kim et al. | |
| 2009/0303918 A1* | 12/2009 | Ma et al. | 370/315 |
| 2010/0002641 A1* | 1/2010 | Li et al. | 370/329 |

FOREIGN PATENT DOCUMENTS

| | | |
|---|---|---|
| CN | 101150553 A | 3/2008 |
| CN | 101199149 A | 6/2008 |
| EP | 1564657 A1 | 8/2005 |
| WO | WO 2007/051157 A2 | 5/2007 |

OTHER PUBLICATIONS

Written Opinion of the International Searching Authority for International Application No. PCT/CN2009/072910, mailed Nov. 5, 2009.

International Preliminary Report on Patentability for International Application No. PCT/CN2009/072910, issued Jan. 25, 2011.

Extended European Search Report issued in European Patent Application No. 08876917.9, dated Feb. 14, 2012 (7 pages).

* cited by examiner

METHOD FOR SUB-CHANNELIZATION AND RESOURCE MAPPING OF WIRELESS RESOURCES

CROSS-REFERENCE TO RELATED APPLICATIONS

This application is the U.S. National Stage filing under 35 U.S.C. §371 of International Application No. PCT/CN2009/072910 filed Jul. 24, 2009, which claims benefit of Chinese Patent Application No. 200810133764.2, filed Jul. 24, 2008.

FIELD OF THE INVENTION

The present invention relates to the field of communication, and especially, to a method for sub-channelization and resource mapping.

BACKGROUND OF THE INVENTION

In wireless communication systems, a base station is an equipment for providing services to a terminal, and the base station communicates with a terminal via up direction/down direction links, wherein the up direction refers to a direction from the terminal to the base station, and the down direction refers to a direction from the base station to the terminal. Multiple terminals can simultaneously send data to the base station via the uplink and can simultaneously receive data from the base station via the downlink as well. In wireless communication systems which adopt the base station to realize the scheduling and control of wireless resources, the scheduling and allocation of the wireless resources of the system are carried out by the base station, for example, the base station provides resource allocation information when the base station performs transmission, resource allocation information which can be used when the terminal performs uplink transmission, and etc.

In commercial wireless communication systems, when the base station is scheduling wireless resources of an air interface, generally one wireless frame is taken as one scheduling period, and one wireless frame is divided into several resource units of the same size (for example, one time slot and one code word) to perform scheduling. During the scheduling period, the base station can schedule all the resources within the wireless frame and provide data or multimedia services to all terminals covered by the base station. For example, in 2G wireless communication systems with GSM (Global System for Mobile Communication) as a representative, the base station divides the wireless resources at each frequency point into one TDMA (Time Division Multiple Access) wireless frame of 4.615 ms, and each wireless frame comprises 8 identical time slots, wherein one time slot can transmit one full rate call or two half rate calls, and can also realize low rate data services. In 2.5G wireless communication systems with GPRS (General Packet Radio Service) as a representative, by introducing packet switching which is performed based on a fixed time slot, the rate of data services can be enhanced up to above 100 kbps, while they still can not support multimedia services such as video. In 3G wireless communication systems with TD-SCDMA (Time-Division Synchronization Code Division Multiple Access) as a representative, the base station likewise divides the wireless resources of the air interface into wireless frames with a period of 10 ms, and each wireless frame comprises 14 normal time slots and 6 special time slots, wherein the normal time slots are used to transmit specific services and signalings, and the base station distinguishes users by different code words on each normal time slot.

With the fast development of communication technologies, the commercial wireless communication systems are unable to meet the user's demands of high transmission rate, high-speed motion and low time delay, which are reflected in increasingly growing demands on high speed data and fluent multimedia services, and this also raises new requirements and challenges for the design of future wireless communication systems.

Future wireless communication systems, with an LTE (Long Term Evolution) system, a UMB (Ultra Mobile Broadband) and IEEE 802.16m as representatives, use OFDM (Orthogonal Frequency Division Multiplexing) and OFDMA (Orthogonal Frequency Division Multiple Address) technologies, and thus make the possibility of high rate transmission. However, at the same time, it imposes new restraints on wireless resource management and raises the demands on future wireless communication systems as follows.

1. With the increase of communication service traffic, the system bandwidth taken up by the future wireless communication systems becomes wider and wider, and at the same time it requires that the future wireless communication systems support different system bandwidths so as to support terminals of different types or abilities;

2. With the increasingly tighter future wireless frequency spectrum resources, it is required that future wireless communication systems should support multi-carrier operations, in order to fully use scattered frequency band resources.

3. As there will be more and more service types to be supported in the future, different types of services have different demands on the QoS (Quality of Service) and on wireless resource units, especially a VoIP (Voice over Internet Protocol) data packet and small control-type messages.

4. The frame structure and control channel of future wireless communication have higher requirements on wireless resource management.

It can be seen that the current wireless resource units (such as time slots and code words) and their corresponding sub-channelization and resource mapping procedure have already become unable to fully meet the demands of the future wireless communication systems. To assure the frequency spectrum efficiency for the future wireless communication systems, it is necessary to design a new method for sub-channelization and resource mapping of wireless resources.

SUMMARY OF THE INVENTION

The present invention is proposed considering the problem in the prior art that current wireless resource units and their corresponding sub-channelization and resource mapping process have already become unable to fully meet the demands of future wireless communication systems, and therefore, the present invention mainly aims at providing a method for sub-channelization and resource mapping of wireless resources so as to solve the above problem.

To realize the above object, according to one aspect of the present invention, a method for sub-channelization and resource mapping of wireless resources is provided.

The method for sub-channelization and resource mapping of wireless resources according to the present invention comprises: according to bandwidth features or scheduling features supported by a wireless communication system, determining processes of sub-channelization and resource mapping of its wireless resources or parameters of the processes, so that the processes of sub-channelization and resource mapping of wireless resources or the parameters of the processes are different depending on the different bandwidth features or scheduling features.

Wherein, the bandwidth features comprise one of the following and the combination thereof: the wireless communication system supporting multiple carriers at contiguous frequency bands, the wireless communication system supporting multiple carriers at discontiguous frequency bands, and the wireless communication system supporting a single carrier under different bandwidths.

Wherein, the scheduling features comprise one of the following and the combination thereof: a frequency multiplexing manner used by the wireless communication system, a partial frequency multiplexing manner used by the wireless communication system, a resource unit type supported by the wireless communication system, a service type scheduled by the wireless communication system, and a configuration of extended subframes in the wireless communication system.

Wherein, the resource unit type comprises one of the following and the combination thereof: a localized resource unit and a distributed resource unit.

Wherein, the processes at least comprise multi-cell resource mapping and cell-specific resource mapping, wherein the multi-cell resource mapping is to perform permutation operation on a physical resource unit and map the permuted physical resource unit to one or more frequency partitions, and the cell-specific resource mapping is to permute the resource unit in each frequency partition to a localized resource unit and/or a distributed resource unit.

Wherein, that the parameters in the processes are different refers to one of the following and the combination thereof: the unit of permutation operation in the sub-channelization and resource mapping being different, a permutation sequence in the sub-channelization and resource mapping being different, a partitioning of frequency partitions in the sub-channelization and resource mapping being different, localized resource regions and/or distributed resource regions in the sub-channelization and resource mapping being different, and the number of the bits indicating the process of resource mapping being different.

To realize the above object, according to another aspect of the present invention, a method for sub-channelization and resource mapping of wireless resources is provided.

The method for sub-channelization and resource mapping of wireless resources according to the present invention comprises: according to functional features and/or scheduling features of a frame or a subframe in a frame structure of a wireless communication system, determining a process of sub-channelization and resource mapping of wireless resources or parameters of the process, so that the frame or subframe with different functional features and/or scheduling features has different process of sub-channelization and resource mapping or different parameters of the process.

Wherein, the process at least comprises a first resource mapping and a second resource mapping, wherein the first resource mapping performs permutation operation on a physical resource unit and maps the permuted physical resource unit to one or more frequency partitions, and the second resource mapping permutes the resource unit in each frequency partition to a localized resource unit and/or a distributed resource unit.

Wherein, that the parameters in the process are different refers to one of the following and the combination thereof: the unit of permutation operation in the sub-channelization and resource mapping being different, permutation sequence in the sub-channelization and resource mapping being different, partitioning of frequency partitions in the sub-channelization and resource mapping being different, and localized resource regions and/or distributed resource regions in the sub-channelization and resource mapping being different.

Wherein, the functional features of the frame or subframe comprise one of the following and the combination thereof: whether the frame or subframe comprise a superframe header and/or a synchronous channel, whether the frame or subframe needs to simultaneously provide services to multiple wireless communication systems, and whether the frame or subframe comprises control channels.

Wherein, the scheduling features of the frame or subframe comprise one of the following and the combination thereof: a frequency multiplexing manner used by the frame or subframe, a partial frequency multiplexing manner used by the frame or subframe, a resource unit type used by the frame or subframe, a service type scheduled by the frame or subframe, and whether the subframe is an extended subframe.

To realize the above object, according to still another aspect of the present invention, a method for sub-channelization and resource mapping of wireless resources is provided.

The method for sub-channelization and resource mapping of wireless resources according to the present invention comprises: dividing wireless resources on a bandwidth of a wireless communication system into multiple physical resource units, performing a permutation operation on the multiple physical resource units with N physical resource units as a unit, and mapping the permuted physical resource unit to one or more frequency partitions, wherein different frequency partitions independently select an value of N.

Wherein, the method further comprises: determining the value of N according to bandwidth features occupied by the wireless communication system and/or scheduling features, or predetermining the value of N.

Wherein, after determining the value of N according to the bandwidth features occupied by the wireless communication system and/or scheduling features, the method further comprises: notifying a terminal of the value of N via a broadcast channel.

Wherein, determining the value of N according to the bandwidth features occupied by the wireless communication system or scheduling features specifically comprises: setting a predetermined value set, selecting the value of N from the predetermined value set according to the bandwidth features occupied by the wireless communication system or scheduling features, and performing the sub-channelization and resource mapping according to the value of N.

Wherein, the method further comprises: notifying the terminal of the bandwidth features occupied by the wireless communication system or scheduling features and the predetermined value set; and the terminal selecting the value of N from the predetermined value set according to the bandwidth features occupied by the wireless communication system or scheduling features.

Wherein, the scheduling features comprise one of the following and the combination thereof: a frequency multiplexing manner used by the wireless communication system, a partial frequency multiplexing manner used by the wireless communication system, a resource unit type supported by the wireless communication system, a service type scheduled by the wireless communication system, a configuration of an extended subframe in the wireless communication system, a configuration of a control channel in the wireless communication system, and whether the wireless communication system needs to provide services to multiple wireless communication systems simultaneously.

To realize the above object, according to still another aspect of the present invention, a method for sub-channelization and resource mapping of wireless resources is provided.

The method for sub-channelization and resource mapping of wireless resources according to the present invention comprises: setting frequency partitions of each of the subframes in an extended subframe to be the same, wherein the number of sub-carriers occupied by a wireless resource unit of the extended subframe in frequency domain is the same with the number of sub-carriers occupied by that of a non-extended subframe in frequency domain, and also, the number of symbols occupied by the wireless resource unit of the extended subframe in time domain is the same with the number of symbols occupied by the extended subframe.

Wherein, the localized resource region and/or distributed resource region in the frequency partition of each of the subframes in the extended subframe occupies the same physical resource unit or physical sub-carrier.

To realize the above object, according to still another aspect of the present invention, a method for sub-channelization and resource mapping of wireless resources is provided.

The method for sub-channelization and resource mapping of wireless resources according to the present invention comprises: dividing one frequency partition into one or more distributed resource regions and/or one or more localized resource regions.

Wherein, the method further comprises: performing sub-carrier level permutation operation on physical resource units in the distributed resource regions at a downlink to obtain downlink distributed resource units; and performing sub-carrier level and/or resource block level permutation operation on the physical resource units in the distributed resource regions at an uplink to obtain uplink distributed resource units.

Wherein, the method further comprises: mapping physical resource units in the one or more localized resource regions with one or more physical resource units as a unit, to obtain localized resource units.

To realize the above object, according to still another aspect of the present invention, a method for sub-channelization and resource mapping of wireless resources is provided.

The method for sub-channelization and resource mapping of wireless resources according to the present invention comprises: mapping wireless resources into one or more distributed resource units and/or one or more localized resource units; splitting one or more of the distributed resource units and/or one or more of the localized resource units, to obtain multiple distributed resource sub-units and/or multiple localized resource sub-units; and splitting resource blocks constituting the distributed resource units, to obtain multiple sub-resource blocks.

Wherein, the multiple distributed resource sub-units are same in size.

Wherein, the multiple sub-resource blocks are same in size.

Wherein, the resource sub-units or sub-resource blocks are used to carry data or control information, wherein the control information at least comprises one of the following: HARQ feedback information, CQI feedback information, power control information, and pre-coding matrix information.

To realize the above object, according to still another aspect of the present invention, a method for sub-channelization and resource mapping of wireless resources is provided.

The method for sub-channelization and resource mapping of wireless resources according to the present invention comprises: in subframes occupied by a broadcast channel, dividing wireless resources occupied by the subframes into multiple physical resource units, and mapping the multiple physical resource units onto one or more frequency partitions, wherein each frequency partition is divided into one or more distributed resource regions.

Wherein, the broadcast channel is a broadcast channel in a superframe header.

To realize the above object, according to still another aspect of the present invention, a method for sub-channelization and resource mapping of wireless resources is provided.

The method for sub-channelization and resource mapping of wireless resources according to the present invention comprises: mapping wireless resources into one or more distributed resource units and/or one or more localized resource units; and splitting one or more of the distributed resource units and/or one or more of the localized resource units, to obtain multiple distributed resource sub-units and/or multiple localized resource sub-units.

With at least one of the above technical solutions of the present invention, the frequency spectrum efficiency of future wireless communication systems is assured by standardizing the process of sub-channelization and resource mapping of wireless communication systems.

BRIEF DESCRIPTION OF THE ACCOMPANYING DRAWINGS

The accompanying drawings herein are used to provide further understanding of the present invention and constitute a part of the specification. The accompanying drawings are used to explain the present invention together with the embodiment of the present invention and shall not be construed as limitations on the same. In the accompanying drawings.

DETAILED DESCRIPTION OF EMBODIMENTS

In view of the above problem, the present invention raises a method for sub-channelization and resource mapping of wireless resources to ensure the frequency spectrum efficiency of future wireless communication systems.

In wireless communication systems the main basis of resource sub-channelization and resource mapping is a corresponding frame structure. The scheduling structure of the wireless resources of the system is divided according to the frame structure. To carry out the allocation of the wireless resources, it is necessary to use sub-channelization and resource mapping to map wireless physical resources into logical resource allocating units. In future wireless communication systems (for example, in wireless communication systems based on OFDM and OFDMA technologies), generally it is necessary to divide the wireless resources into different levels of resource regions for scheduling, for example, dividing the wireless resources into superframes, frames, subframes and symbols for scheduling, the specific operation of which is described as follows: the wireless resources are divided into superframes which are continuous in time, wherein each superframe comprises multiple frames each of which comprises multiple subframes, and a subframe consists of the most basic OFDM symbols. In a superframe, the numbers of the frames, the subframes, and the OFDM symbols are determined by basic parameters of an OFDM system. In addition, to improve transmission efficiency, multiple subframes can be concatenated to realize uniform scheduling.

Figure 1:
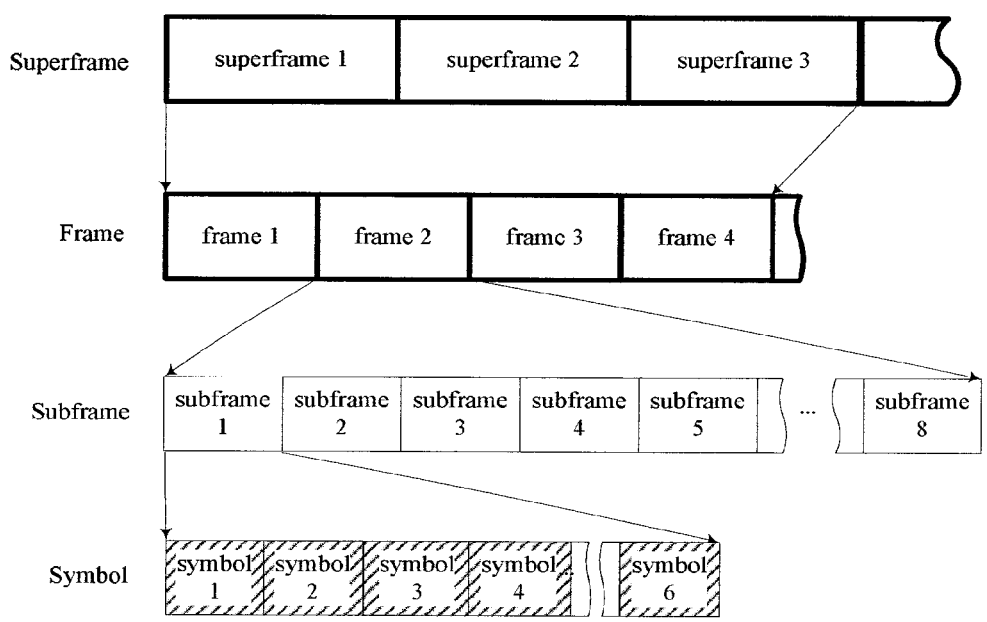
FIG. 1 is a schematic view of the frame structure of a wireless communication system in a related art.

FIG. 1 is a schematic view of the frame structure of a wireless communication system, and as shown in FIG. 1, the wireless resources are divided into temporally contiguous superframes, wherein each superframe comprises 4 frames, each frame comprises 8 subframes, each subframe consists of 6 basic OFDM symbols, and for improving the scheduling efficiency, multiple subframes can be concatenated together to realize uniform scheduling. Based on this, it is a basic feature of future wireless communication systems that the wireless resources are divided into several relatively small regions (for example, subframes) to perform the scheduling.

The present invention will be detailed hereinafter in conjunction with the drawings.

Method Embodiment 1

According to the embodiment of the present invention, a method for sub-channelization and resource mapping of wireless resources is provided.

Figure 2:
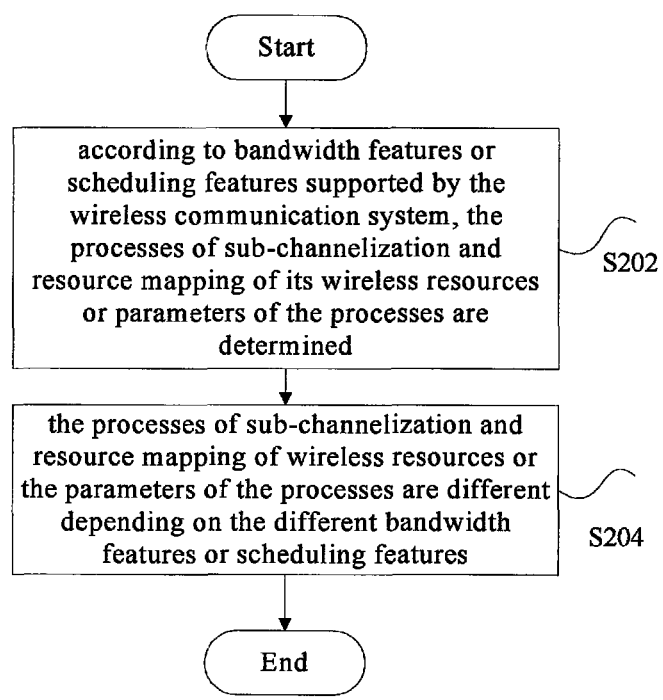
FIG. 2 is a flow chart of the method for sub-channelization and resource mapping of wireless resources according to method embodiment 1 of the present invention.

FIG. 2 is a flow chart of the method for sub-channelization and resource mapping of wireless resources according to the embodiment of the present invention, and as shown in FIG. 2, the method comprises the following step S202 to step S204:

Step S202, according to bandwidth features or scheduling features supported by the wireless communication system, the processes of sub-channelization and resource mapping of its wireless resources or parameters of the processes are determined; and Step S204, the processes of sub-channelization and resource mapping of wireless resources or the parameters of the processes are different depending on the different bandwidth features or scheduling features.

In virtue of the technical solution provided by the embodiment of the present invention, the processes of sub-channelization and resource mapping of the wireless communication system are standardized according to different multi-carrier information and bandwidth information supported by the wireless communication system, and the flexibility in scheduling the wireless resources in the wireless communication system is enhanced, thereby assuring the frequency spectrum efficiency of the wireless communication system and improving the scheduling efficiency of the wireless resources.

In the method, the above bandwidth features comprise one of the following and the combination thereof: the wireless communication system supporting multiple carriers at contiguous frequency bands, the wireless communication system supporting multiple carriers at a discontiguous frequency bands, and the wireless communication system supporting a single carrier under different bandwidths.

In the method, the above scheduling features comprise one of the following and the combination thereof: a frequency multiplexing manner used by the wireless communication system, a partial frequency multiplexing manner used by the wireless communication system, a resource unit type supported by the wireless communication system, a service type scheduled by the wireless communication system, and a configuration of extended subframes in the wireless communication system.

In the method, the resource unit type comprises one of the following and the combination thereof: a localized resource unit and a distributed resource unit.

In the method, the service type scheduled by the wireless communication system comprises one of the following and the combination thereof: unicast data, multicast data, broadcast data, unicast control information, multicast control information and broadcast control information.

In the method, the above processes at least comprise external permutation and internal permutation, wherein the external permutation is called a first resource mapping, which performs permutation operation on a PRU (Physical Resource Unit) and maps the permuted PRU onto one or more FPs (Frequency Partition); and the internal permutation is called a second resource mapping, which finally maps the resource unit in each FP to be an LLRU (Logical Localized Resource Unit) and/or a LDRU (Logical Distributed Resource Unit), wherein the LLRU is also called a LCRU (Logical Contiguous Resource Unit).

Figure 3:
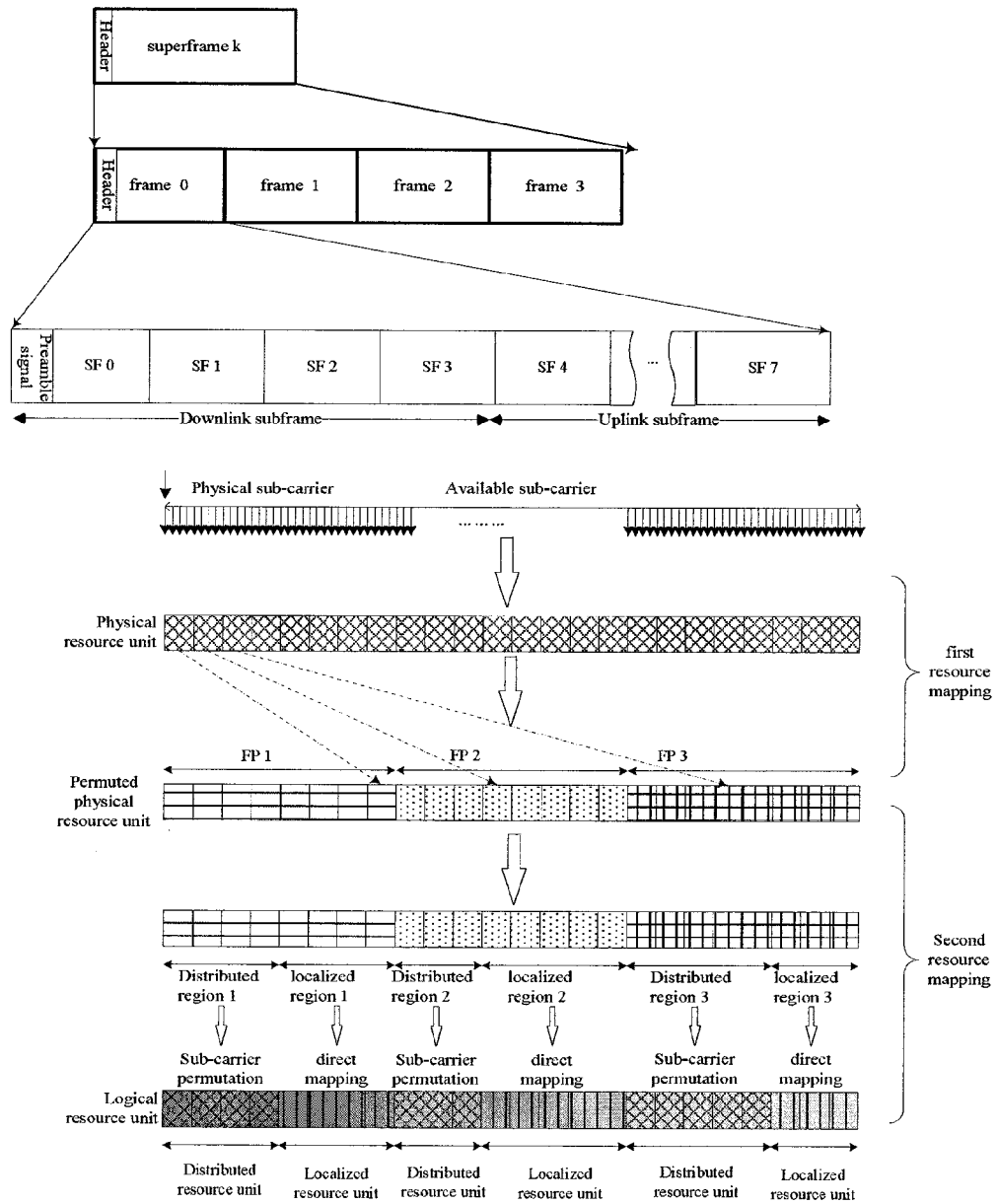
FIG. 3 is a schematic view of the process of sub-channelization and resource mapping for a 5 MHz wireless communication system according to an embodiment of the present invention.

As shown in FIG. 3, the localized resource unit and the distributed resource unit, both as the one after the permutation, are logical resource units. Hence, strictly speaking, the localized resource unit is a Logical Localized Resource Unit (LLRU), and the localized resource unit is also called a CRU, thus strictly speaking, the CRU is a Logical Contiguous Resource Unit (LCRU). Strictly speaking, the DRU is a Logical Distributed Resource Unit (LDRU). In the case that no confusion is incurred, the DRU can be used to substitute the LDRU, and the CRU is used to substitute the LCRU or the LLRU. It is similar to the DRU and the CRU that are involved in the Description.

In the method, that the parameters in the processes are different refers to one of the following and the combination thereof: the units of the permutation operation in the sub-channelization and resource mapping being different, a permutation sequence in the sub-channelization and resource mapping being different, a partitioning of the frequency partitions in the sub-channelization and resource mapping being different, localized resource regions and/or distributed resource regions in the sub-channelization and resource mapping being different, and the number of the bits indicating the process of resource mapping being different.

In the method, in the processes of sub-channelization and resource mapping of wireless resources, the physical resource unit is mapped onto the frequency partition via the first resource mapping, and in the processes of sub-channelization and resource mapping of wireless resources, the physical resource unit after the first resource mapping is mapped into the LDRU and/or LLRU via the second resource mapping, downlink distributed resource units are obtained by sub-carrier permutation, and uplink distributed resource units are obtained by resource block (Tile) permutation, wherein, Tile refers to a resource block comprising independent pilot sub-carrier(s) and data sub-carrier(s).

Figure 4:
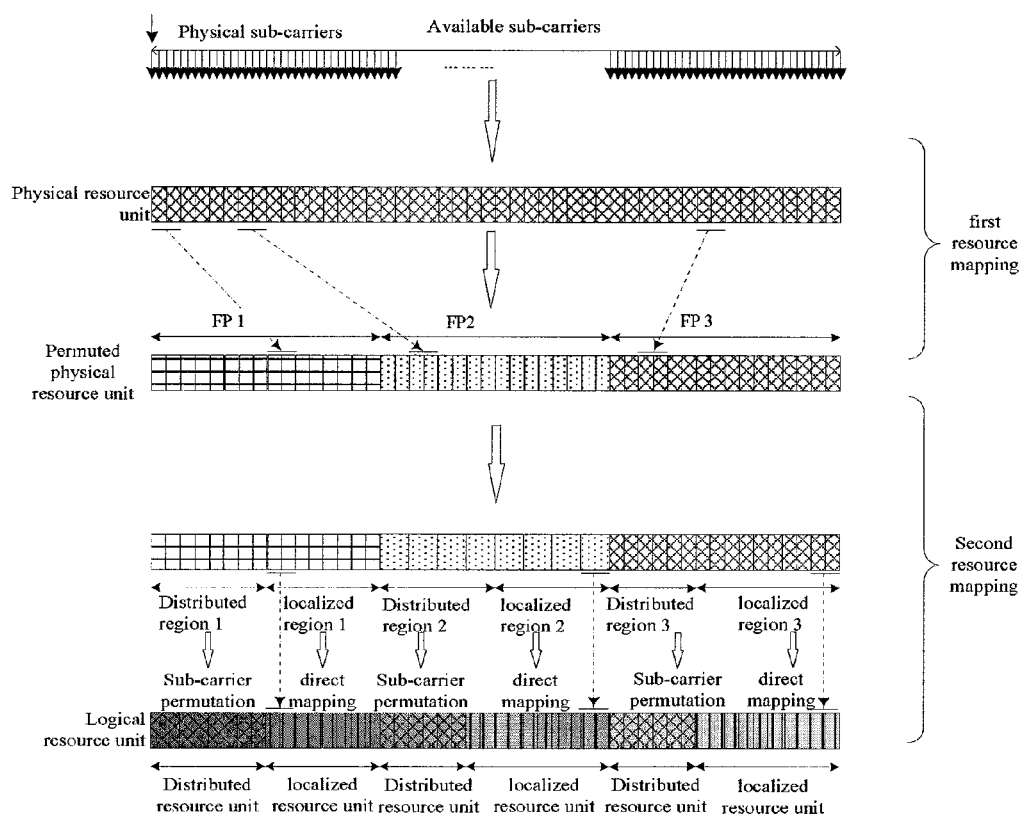
FIG. 4 is a schematic view of the process of sub-channelization and resource mapping for a 10 MHz wireless communication system according to an embodiment of the present invention.

FIG. 3 illustrates a flow chart of the processes of sub-channelization and resource mapping for a 5 MHz wireless communication system according to the embodiments of the present invention, and FIG. 4 illustrates a flow chart of the processes of sub-channelization and resource mapping for a 10 MHz wireless communication system according to the embodiments of the present invention. As shown in FIG. 3, the 5 MHz wireless communication system uses 1 physical resource unit as a unit while performing the first resource mapping for the physical resource unit. As shown in FIG. 4, the 10 MHz wireless communication system uses 2 physical resource units as a unit while performing the first resource mapping for the physical resource unit.

Method Embodiment 2

According to the embodiment of the present invention, a method for sub-channelization and resource mapping of wireless resources is provided.

Figure 5:
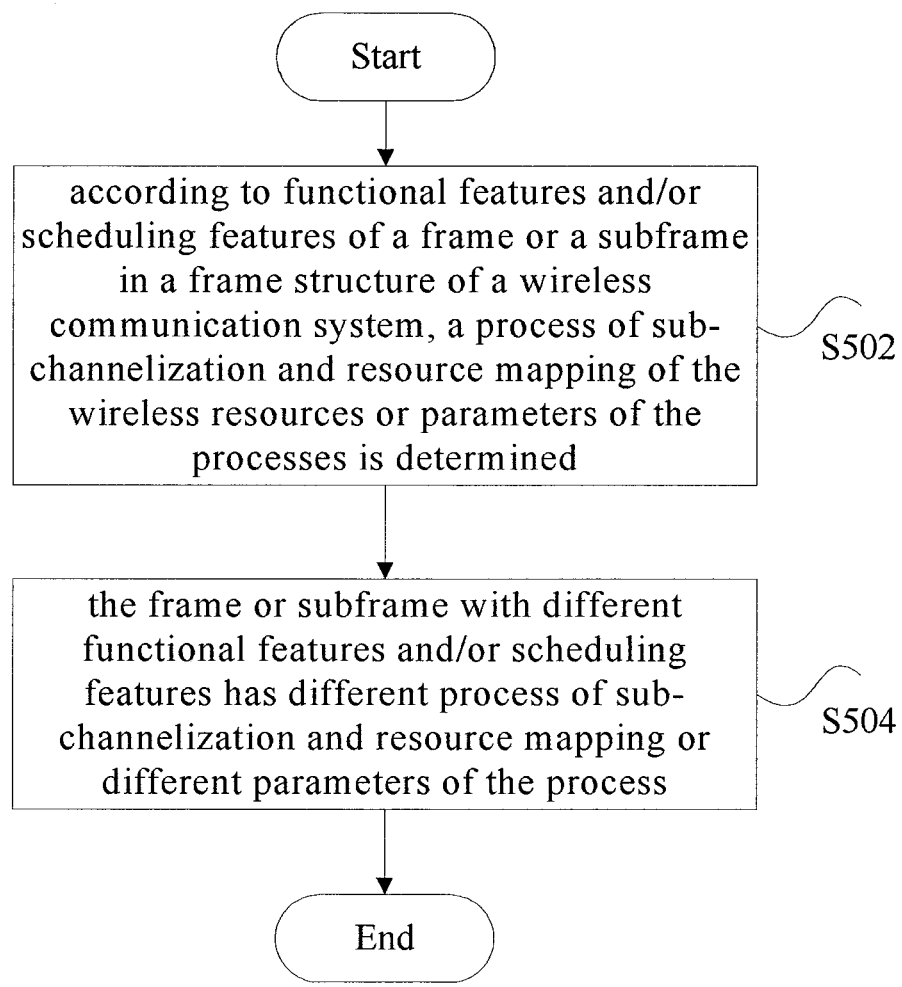
FIG. 5 is a flow chart of the method for sub-channelization and resource mapping of wireless resources according to method embodiment 2 of the present invention.

FIG. 5 is a flow chart of the method for sub-channelization and resource mapping of wireless resources according to the embodiment of the present invention, and as shown in FIG. 5, the method comprises the following step S502 to step S504:

Step S502, according to functional features and/or scheduling features of a frame or a subframe in a frame structure of a wireless communication system, a process of sub-channelization and resource mapping of the wireless resources or parameters of the processes is determined; and Step S504, the frame or subframe with different functional features and/or scheduling features has different process of sub-channelization and resource mapping or different parameters of the process.

In the method, the functional features of the frame or subframe comprise one of the following and the combination thereof: whether the frame or subframe comprises a superframe header and/or a synchronous channel, whether the frame or subframe needs to simultaneously provide services to multiple wireless communication systems, and whether the frame or subframe comprises control channels.

In the method, the scheduling features of the frame or subframe comprise one of the following and the combination thereof: a frequency multiplexing manner used by the frame or subframe, a partial frequency multiplexing manner used by the frame or subframe, a resource unit type used by the frame or subframe, a service type scheduled by the frame or subframe, and whether the subframe is an extended subframe.

In the method, the resource unit type comprises one of the following and the combination thereof: a logical localized resource unit and a logical distributed resource unit.

In the method, the service type scheduled by the wireless communication system comprises one of the following and the combination thereof: unicast data, multicast data, broadcast data, unicast control information, multicast control information and broadcast control information.

In the method, the process at least comprises a first resource mapping and a second resource mapping, wherein the first resource mapping performs permutation operation on a physical resource unit and maps the permuted physical resource unit onto one or more frequency partitions, and the second resource mapping permutes the resource unit in each frequency partition to a logical localized resource unit and/or a logical distributed resource unit.

In the above, that the parameters in the process are different refers to one of the following and the combination thereof: the unit of the permutation operation in the sub-channelization and resource mapping being different, the permutation sequence in the sub-channelization and resource mapping being different, the partitioning of the frequency partitions in the sub-channelization and resource mapping being different, localized resource regions and/or distributed resource regions in the sub-channelization and resource mapping being different, and the numbers of the bits indicating the process of resource mapping being different.

In virtue of the technical solution provided by the embodiment of the present invention, the process of sub-channelization and resource mapping of the wireless communication system is standardized according to the structure features or scheduling features of the subframe, thus the flexibility of scheduling the wireless resources in the wireless communication system is enhanced, thereby assuring the frequency spectrum efficiency of the wireless communication system and improving the scheduling efficiency of the wireless resources.

Figure 6:
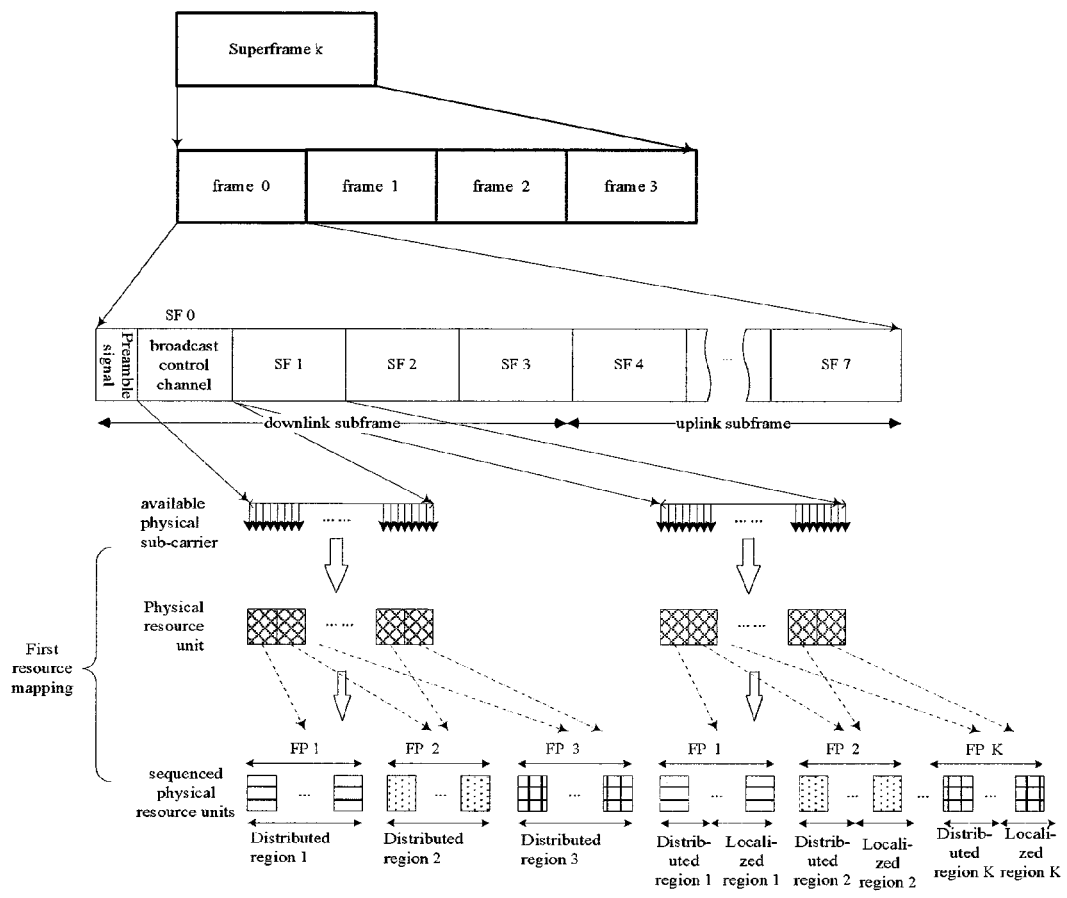
FIG. 6 is a schematic view of the process of sub-channelization and resource mapping for different subframes according to a method embodiment of the present invention.

FIG. 6 is a schematic view of the processes of sub-channelization and resource mapping of the wireless communication system of the method shown in FIG. 5. As it is seen from FIG. 6, the downlink broadcast channel occupies subframe 0, available physical sub-carrier is divided into physical resource units and into 3 frequency Partitions, wherein each frequency Partition only comprises the distributed resource region, and subframe 1 is different from subframe 0, subframe 1 does not comprise any broadcast channel and is divided into K frequency Partitions, wherein each frequency Partition comprises the distributed resource region and the localized resource region.

Method Embodiment 3

According to the embodiment of the present invention, a method for sub-channelization and resource mapping of wireless resources is provided.

Figure 7:
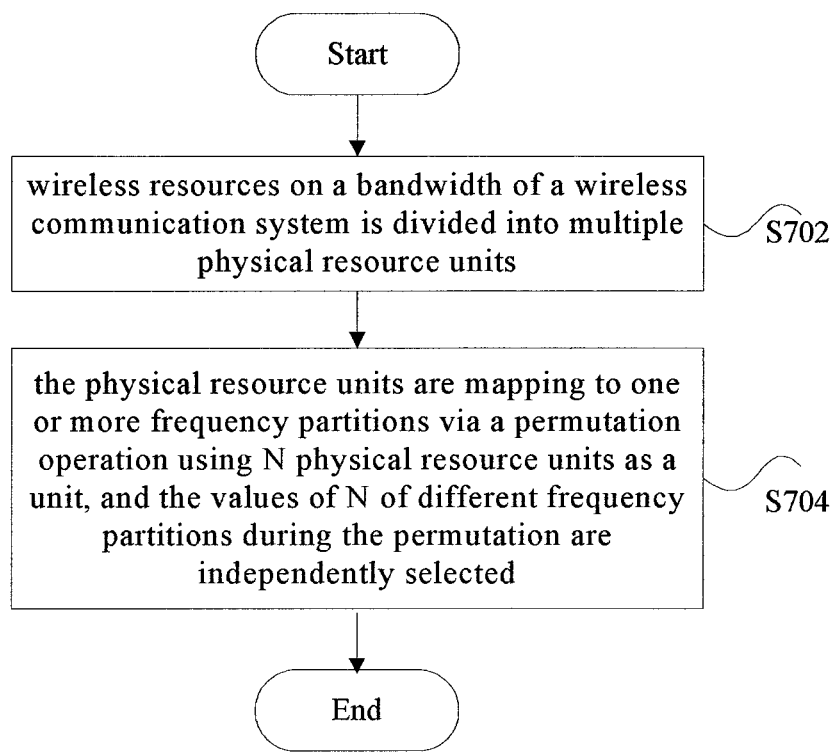
FIG. 7 is a flow chart of the method for sub-channelization and resource mapping of wireless resources according to method embodiment 3 of the present invention.

FIG. 7 is a flow chart of the method for sub-channelization and resource mapping according to the embodiment of the present invention, and as shown in FIG. 7, the method comprises the following step S702 to step S704:

Step S702, wireless resources on a bandwidth of a wireless communication system is divided into multiple physical resource units; and Step S704, a permutation operation is performed on the multiple physical resource units with N physical resource units as a unit, and the permuted physical resource units are mapped onto one or more frequency partitions, wherein the value of N can be selected independently for different frequency partitions, and a same value of N or different value of N can be selected for different frequency partitions.

In virtue of the technical solution provided by the embodiment of the present invention, the physical resource units are divided based on the number of the carriers and the number of symbols of the physical resource units, thus the processes of sub-channelization and resource mapping of the wireless communication system are standardized, and the flexibility of scheduling the wireless resources in the wireless communication system is enhanced, thereby assuring the frequency spectrum efficiency of the wireless communication system and improving the scheduling efficiency of the wireless resources.

In the method, through setting a predetermined value set, the value of N can be selected from the predetermined value set according to the bandwidth features occupied by the wireless communication system and/or scheduling features, and the bandwidth features occupied by the wireless communication system and/or scheduling features and the predetermined value set are notified to a terminal; the terminal selects the value of N from the predetermined value set according to the bandwidth features occupied by the wireless communication system and/or scheduling features.

Preferably, it is also possible to use a preset value of N, wherein the value of N can be pre-stipulated in a standard protocol.

In the above, the scheduling features comprise one of and the combination of: a frequency multiplexing manner used by the wireless communication system, a partial frequency multiplexing manner used by the wireless communication system, a resource unit type supported by the wireless communication system, a service type scheduled by the wireless communication system, the configuration of extended subframes in the wireless communication system, the configuration of a control channel in the wireless communication system, and whether the wireless communication system needs to provide services to multiple wireless communication systems simultaneously, wherein the extended subframes refer to two or more contiguous subframes that are uniformly scheduled.

In the method, the unit used in the process of the first resource mapping performed to the physical resource units is related to the bandwidth, and as shown in FIG. 3, the 5 MHz wireless communication system uses 1 physical resource unit as a unit to perform the first resource mapping for the physical resource units, and as shown in FIG. 4, the 10 MHz wireless communication system uses 2 physical resource units as a unit to perform the first resource mapping for the physical resource units.

Preferably, the terminal can determine the value of N in the following two manners:

Manner 1: through setting a predetermined value set, the value of N is selected from the predetermined value set according to the bandwidth features occupied by the wireless communication system and/or scheduling features, and the bandwidth features and/or scheduling features occupied by the wireless communication system and the predetermined value set are notified to the terminal; the terminal selects the value of N from the predetermined value set according to the bandwidth features occupied by the wireless communication system and/or scheduling features. When the first resource mapping is performed to the physical resource units, a base station designates a value set of N (i.e., the above predetermined value set) and determines the value of N from the predetermined value set according to the bandwidth features occupied by the wireless communication system and/or scheduling features, that is, there exists a corresponding relationship between the value of N and the bandwidth features occupied by the system and/or scheduling features, the base station notifies to the terminal the bandwidth features occupied by the wireless communication system and/or scheduling features and the value set, and the terminal determines the value of N from the value set according to the bandwidth features occupied by the wireless communication system and/or scheduling features, and then sub-channelization and resource mapping are performed according to the value of N.

Manner 2: the base station notifies to the terminal the value of N via a primary broadcast channel.

For example, for wireless communication systems supporting 5 MHz, 10 MHz and 20 MHz, the value of N used during the permutation operation can be selected from a set of $\{1, 2, 4\}$, and the 5 MHz, 10 MHz and 20 MHz can respectively correspond to 1, 2 and 4, and the terminal obtains a corresponding N value according to the bandwidth information of the system, or, as shown in FIG. 3, the base station broadcasts the value of N in a primary broadcast channel, and the terminal obtains the value of N by decoding the broadcast channel.

Method Embodiment 4

According to the embodiment of the present invention, a method for sub-channelization and resource mapping of wireless resources is provided.

Figure 8:
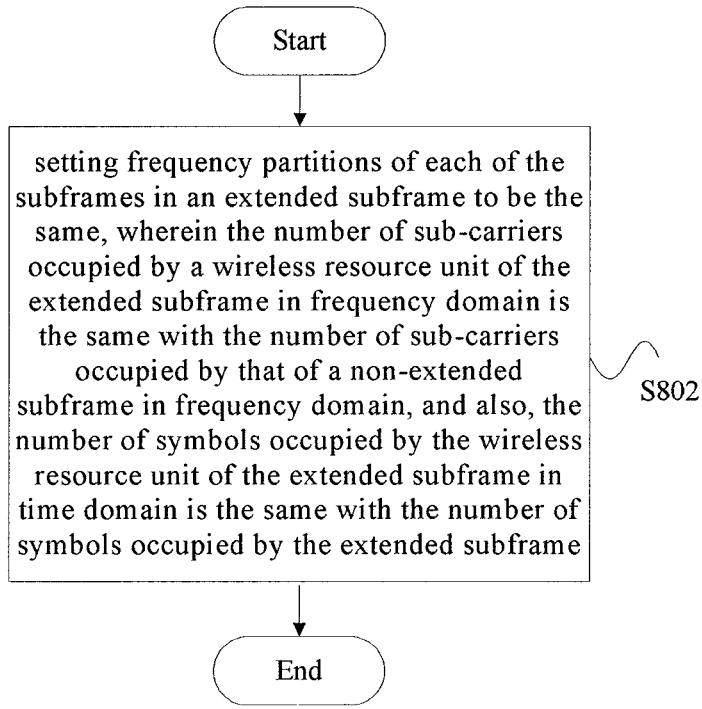
FIG. 8 is a flow chart of the method for sub-channelization and resource mapping of wireless resources according to method embodiment 4 of the present invention.

FIG. 8 is a flow chart of the method for sub-channelization and resource mapping of wireless resources according to the embodiment of the present invention, and as shown in FIG. 8, the method comprises the following step S802:

Step S802, setting frequency partitions of each of the subframes in an extended subframe to be the same, wherein the number of sub-carriers occupied by a wireless resource unit of the extended subframe is the same in frequency domain with the number of sub-carriers occupied by that of a non-extended subframe, and also, the number of symbols occupied by the wireless resource unit of the extended subframe is the same in time domain with the number of symbols occupied by the extended subframe.

In virtue of the technical solution provided by the embodiment of the present invention, the processes of sub-channelization and resource mapping of the wireless communication system are standardized through setting the structure of each subframe in the extended subframes, and the technical advantages of the frame structure of future wireless communication systems are fully exploited, the flexibility of scheduling the wireless resources in the wireless communication system is enhanced, thereby assuring the frequency spectrum efficiency of the wireless communication system and improving the scheduling efficiency of the wireless resources.

In the method, the localized resource region and/or distributed resource region in the frequency partition of each subframe in the extended subframes occupies same physical resource units and/or physical sub-carriers.

Figure 9:
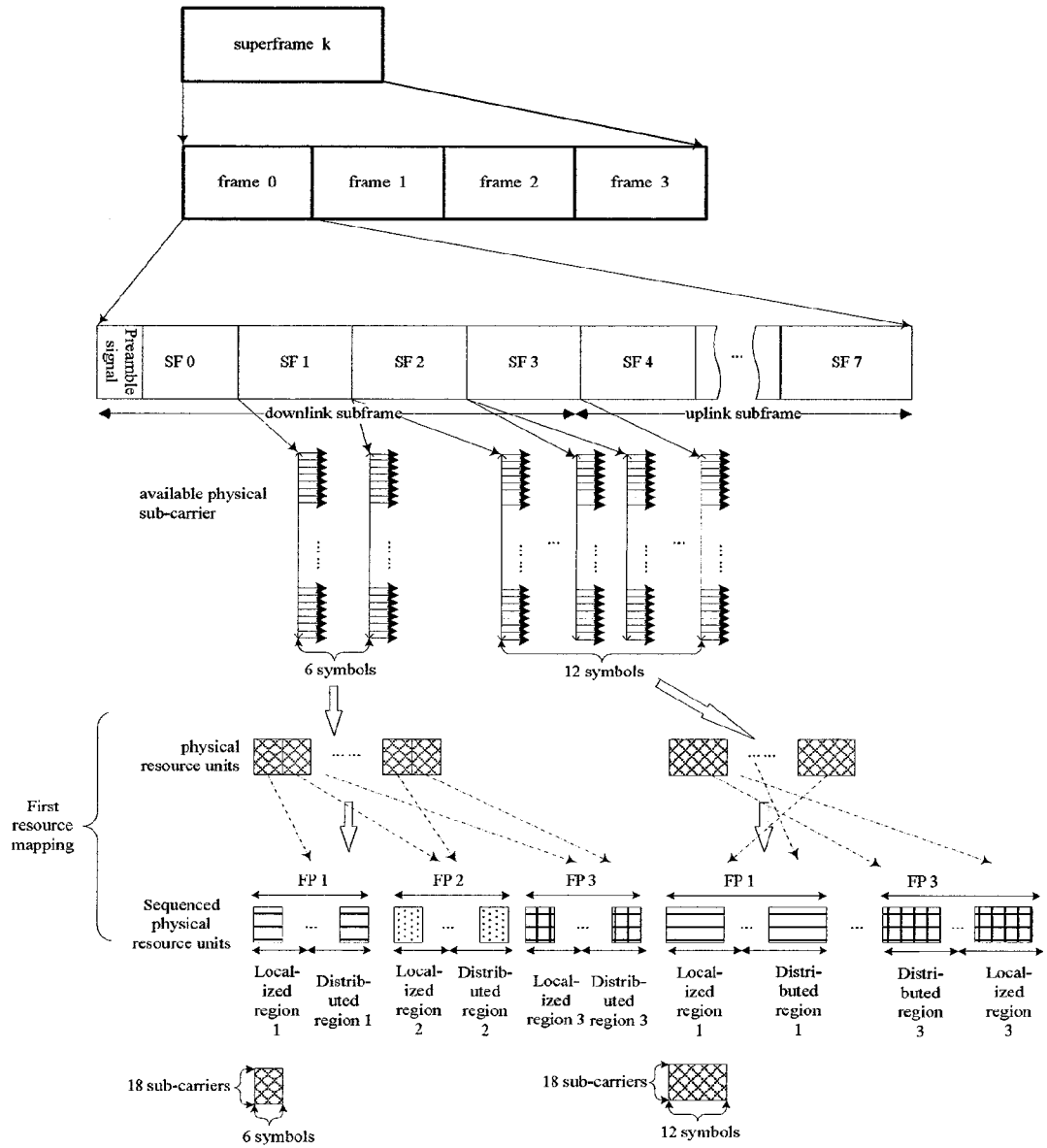
FIG. 9 is a schematic view of the process of sub-channelization and resource mapping of wireless resources of extended subframes according to a method embodiment of the present invention.

FIG. 9 is a schematic view of the process of sub-channelization and resource mapping of the wireless communication system of the method as shown in FIG. 8. As shown in FIG. 9, subframe 2 and subframe 3 constitute one extended subframe, wherein the partitioning of the frequency partitions of subframe 2 and subframe 3 in the extended subframes are same, and the size of the resource unit of the extended subframe in the frequency domain is the same with the size of the resource unit of the non-extended subframe (for example, subframe 1) in the frequency domain, both being 18 sub-carriers. The resource unit of the extended subframe occupies the number of symbols of 2 subframes (subframe 2 and subframe 3) in the time domain, i.e., 12 symbols.

Method Embodiment 5

According to the embodiment of the present invention, a method for sub-channelization and resource mapping of wireless resources is provided.

Figure 10:
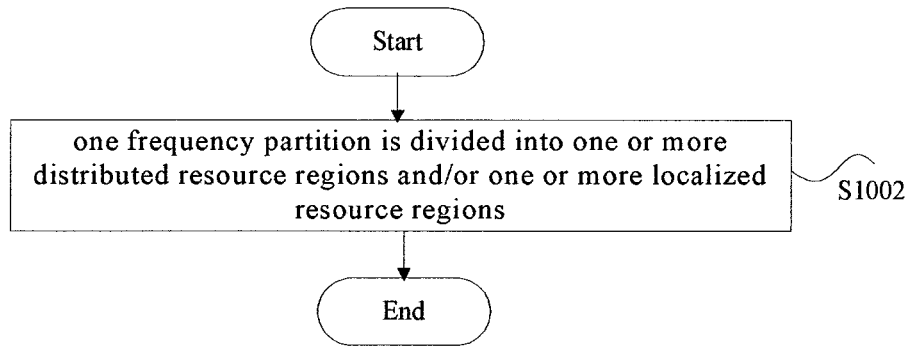
FIG. 10 is a flow chart of the method for sub-channelization and resource mapping of wireless resources according to method embodiment 5 of the present invention.

FIG. 10 is a flow chart of the method for sub-channelization and resource mapping of wireless resources according to the embodiment of the present invention, and as shown in FIG. 10, the method comprises the following step S1002:

Step S1002, one frequency partition is divided into one or more distributed resource regions and/or one or more localized resource regions.

In virtue of the technical solution provided by the embodiment of the present invention, the processes of sub-channelization and resource mapping of the wireless communication system are standardized through dividing one frequency Partition into distributed resource region(s) or localized resource region(s), the flexibility of scheduling the wireless resources in the wireless communication system is enhanced, thereby assuring the frequency spectrum efficiency of the wireless communication system and improving the scheduling efficiency of the wireless resources.

In the method, in the situation of dividing one frequency partition into one or more distributed resource regions, sub-carrier level permutation operation can be performed on the physical resource units in the distributed resource regions at a downlink to obtain downlink distributed resource units, and sub-carrier level and/or resource block level permutation operation can be performed on the physical resource units in the distributed resource regions at an uplink to obtain uplink distributed resource units.

In the method, in the situation of dividing one frequency partition into one or more localized resource regions, the physical resource units in one or more localized resource regions can be mapped with one or more physical resource units as a unit, to obtain localized resource units.

As shown in FIG. 3, each frequency Partition is divided into one distributed resource region and one localized resource region, and the physical resource units in the localized resource region are directly mapped into localized resource units with one physical resource unit as a unit, and the size of the localized resource unit is equal to one physical resource unit, for example, the physical resource units in the localized resource region are directly mapped into localized resource units with 2 physical resource units as a unit, and the size of the localized resource unit is equal to 2 physical resource units.

Method Embodiment 6

According to the embodiment of the present invention, a method for sub-channelization and resource mapping of wireless resources is provided.

Figure 11:
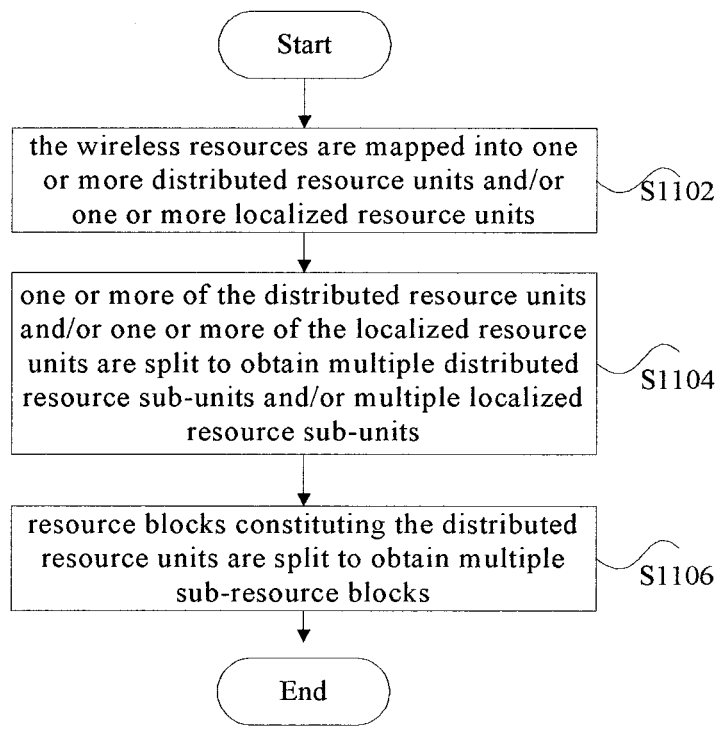
FIG. 11 is a flow chart of the method for sub-channelization and resource mapping of wireless resources according to method embodiment 6 of the present invention.

FIG. 11 is a flow chart of the method for sub-channelization and resource mapping of wireless resources according to the embodiment of the present invention, and as shown in FIG. 11, the method comprises the following step S1102 to step S1104:

Step S1102, the wireless resources are mapped into one or more distributed resource units and/or one or more localized resource units; and Step S1104, one or more of the distributed resource units and/or one or more of the localized resource units are split to obtain multiple distributed resource sub-units and/or multiple localized resource sub-units, wherein the multiple distributed resource sub-units are same in size.

Preferably, the method further comprises:

S1106, resource blocks constituting the distributed resource units are split to obtain multiple sub-resource blocks, wherein the sub-resource blocks are same in size.

In virtue of the technical solution provided by the embodiment of the present invention, the processes of sub-channelization and resource mapping of the wireless communication system are standardized through mapping the wireless resources into one or more distributed resource units, and the flexibility of scheduling the wireless resources in the wireless communication system is enhanced, thereby assuring the frequency spectrum efficiency of the wireless communication system and improving the scheduling efficiency of the wireless resources.

In the method, the above sub-resource blocks are used to carry data or control information, wherein the control information at least comprises one of: HARQ feedback information, CQI feedback information, power control information, and pre-coding matrix information.

As shown in FIG. 9, one distributed resource unit (DRU) or one localized resource unit (LLRU) has a size of 18×6, i.e., occupying 18 sub-carriers in the frequency domain and 6 symbols in the time domain. As the data quantity of the control information is comparatively small, thus the DRU or LLRU can be split into sub-DRUs or sub-LLRUs to transmit the control information so as to improve the frequency spectrum efficiency, wherein the sub-DRUs or sub-LLRUs can be one of: three 6×6, two 9×6, three 18×2, nine 2×6, and nine 6×2, wherein the control information may comprise one of the following and the combination thereof: HARQ feedback information, CQI feedback information, power control information, and pre-coding matrix information.

Alternatively, multiple DRUs are divided into multiple sub-DRUs of fxt, wherein if the size of the DRU is FxT, then the size of the sub-DRU is fxt, wherein f is not larger than F, and t is not larger than T.

In addition, the resource blocks constituting the distributed resource unit can also be split to obtain multiple sub-resource blocks, wherein the sub-resource blocks all have the same size. For example, if one uplink DRU consists of 3 Tiles of 6×6, then each 6×6 can be split into 2 sub-Tiles of 6×3 with the same size, then there will be totally 6 sub-Tiles of 6×3 to transmit the above control information. Or, each 6×6 is split into 3 sub-Tiles of 2×6 with the same size.

It needs to explain that such a form of fxt represents a resource unit which occupies f sub-carriers in the frequency domain and at the same time occupies t OFDMA symbols in the time domain, wherein f and t are both natural numbers, for example, 6×3 represents a resource unit which occupies 6 sub-carriers in the frequency domain and at the same time occupies 3 OFDMA symbols in the time domain.

Method Embodiment 7

According to the embodiment of the present invention, a method for sub-channelization and resource mapping of wireless resources is provided.

Figure 12:
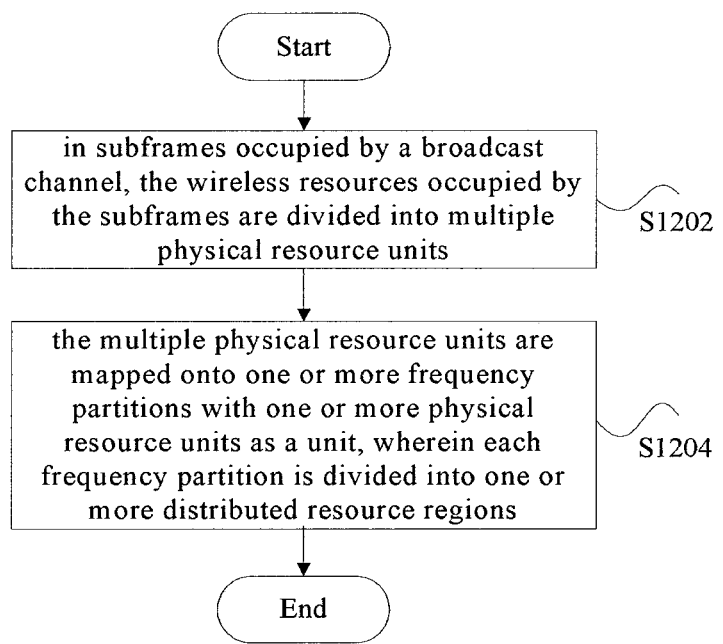
FIG. 12 is a flow chart of the method for sub-channelization and resource mapping of wireless resources according to method embodiment 7 of the present invention.

FIG. 12 is a flow chart of the method for sub-channelization and resource mapping of wireless resources according to the embodiment of the present invention, and as shown in FIG. 12, the method comprises the following step S1202 to step S1204:

Step S1202, in subframes occupied by a broadcast channel, the wireless resources occupied by the subframes are divided into multiple physical resource units; and Step S1204, the multiple physical resource units are, by permutation operation, mapped onto one or more frequency partitions with one or more physical resource units as a unit, wherein each frequency partition is divided into one or more distributed resource regions.

In virtue of the technical solution provided by the embodiment of the present invention, the processes of sub-channelization and resource mapping of the wireless communication system are standardized through dividing the broadcast channel according to the number of carriers of and the number of symbols of the physical resource units, and the flexibility of scheduling the wireless resources in the wireless communication system is enhanced, thereby assuring the frequency spectrum efficiency of the wireless communication system and improving the scheduling efficiency of the wireless resources.

Figure 13:
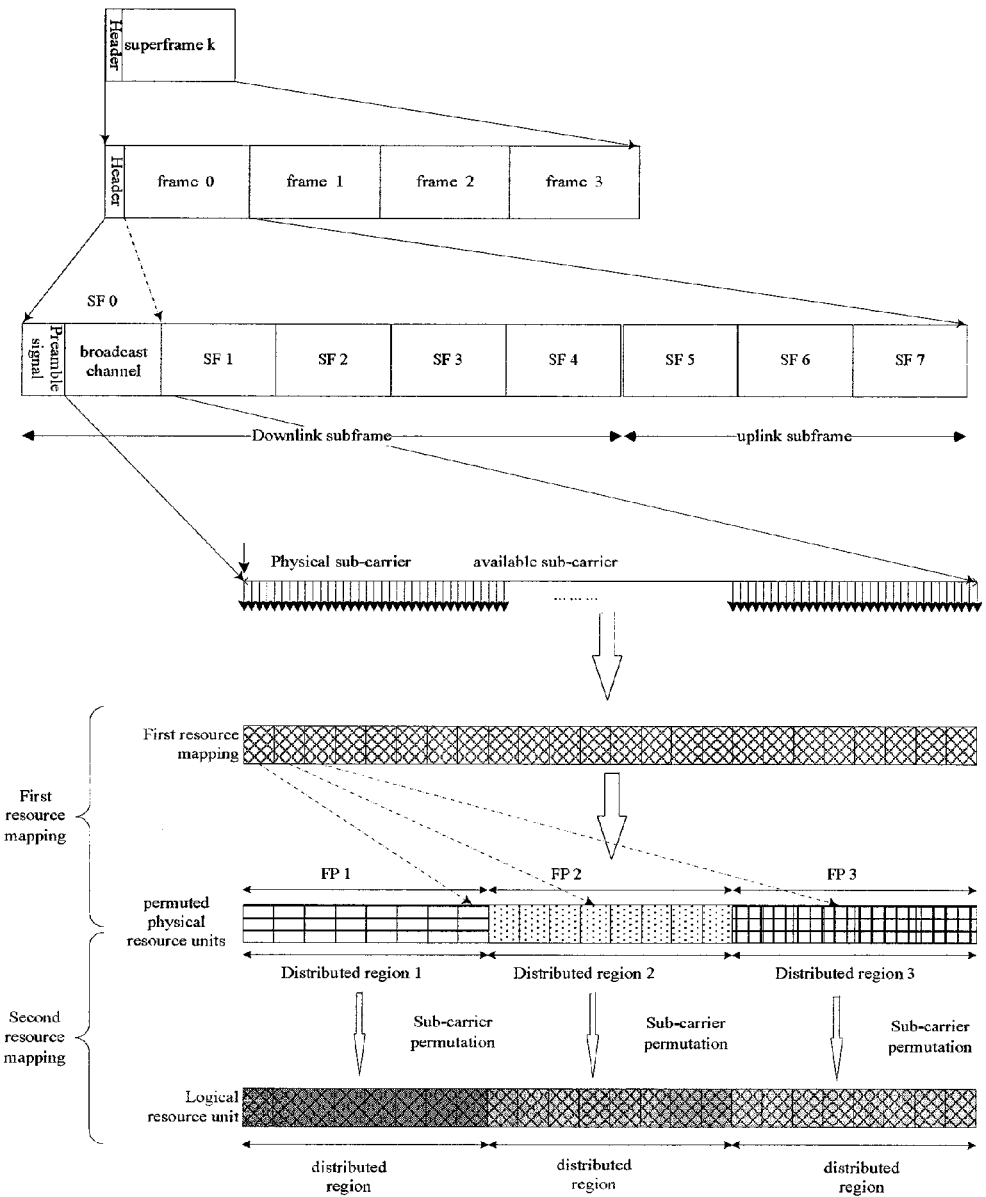
FIG. 13 is a schematic view of the process of sub-channelization and resource mapping of a broadcast control channel according to a method embodiment of the present invention.

FIG. 13 is a schematic view of the process of sub-channelization and resource mapping of a broadcast control channel, wherein as shown in FIG. 13, the frequency Partition of the broadcast control channel only comprises distributed resource regions and corresponding distributed resource units, while the frequency Partition in FIG. 3 and FIG. 4 can comprises not only the distributed resource regions but also the localized resource regions, and the superframe header occupies the first subframe in a superframe. In the processes of sub-channelization and resource mapping of the subframe, all the bandwidth occupied by the superframe header is divided into multiple physical resource units according to the number of carriers and the number of symbols occupied by the physical resource units, a first resource mapping is performed on the physical resource units using 1 physical resource unit as a unit, afterwards the physical resource units are mapped into 3 frequency Partitions, and one frequency Partition is divided into one distributed resource region, excluding the localized resource region.

According to FIG. 13, as the broadcast control channel is located in the first subframe of the superframe, it is also called a Superframe Header (SFH).

According to FIG. 12, FIG. 13 is just an example. Besides, the multiple physical resource units in the subframe where the broadcast control channel is located can also be mapped into only one frequency partition, and the resource units in this frequency partition are all mapped into logical distributed resource units. Similar to FIG. 13, the broadcast control channel occupies the resources starting from the first logical distributed resource unit.

As described above, with the methods for sub-channelization and resource mapping of wireless resources provided by the present invention, future wireless communication systems can be supported. By standardizing the processes of sub-channelization and resource mapping of the wireless communication unit, the flexibility of scheduling the wireless resources in future wireless communication systems is enhanced. The base station can select a proper resource for scheduling according to scheduling requirements. The present invention is seasoned with the scheduling demands of the future wireless communication systems, fully exploits the technical advantages of the frame structure of future wireless communication systems, improves the scheduling efficiency of the wireless resources, and can assure the quality of service (QoS) of various service types and the frequency spectrum efficiency of the future wireless communication systems.

According to the embodiment of the present invention, a computer readable medium is also provided. The computer readable medium stores computer executable instructions, and when the instructions are executed by a computer or a processor, the computer or processor executes the steps as shown in FIGS. 2, 5, 7, 8, 10, 11 and 12, and preferably, they can execute one or more of Embodiments 1 to 7.

Obviously, one skilled in the art shall understand that the above various modules and steps of the present invention can be realized with general computing devices, and can be integrated into one single computing device or distributed within a network consisting of multiple computing devices, and alternatively, the various modules and steps above can be realized with program codes executable by the computing devices, and thus these program codes can be stored in memory devices so as to be executed by the computing devices, or the various modules and steps above can be formed into individual integrated circuit modules, or a plurality of the modules or steps can be formed into a single integrated circuit module so as to be realized. Therefore, the present invention is not limited to any particular hardware or software combination.

The descriptions above are only preferable embodiments of the present invention and are not used to restrict the present invention. For those skilled in the art, the present invention may have various changes and variations. Any modifications, equivalent substitutions, improvements etc. within the spirit and principle of the present invention shall all be included in the scope of protection of the present invention.

The invention claimed is:

1. A method for sub-channelization and resource mapping of wireless resources, comprising:
   according to bandwidth features or scheduling features supported by a wireless communication system, determining processes of sub-channelization and resource mapping of its wireless resources or parameters of the processes, so that the processes of sub-channelization and resource mapping of wireless resources or the parameters of the processes are different depending on the different bandwidth features or scheduling features; wherein:
   (i) the bandwidth features comprise one of the following and the combination thereof: the wireless communication system supporting multiple carriers at contiguous frequency bands, the wireless communication system supporting multiple carriers at discontiguous frequency bands, and the wireless communication system supporting a single carrier under different bandwidths; or
   (ii) the scheduling features comprise one of the following and the combination thereof: a frequency multiplexing manner used by the wireless communication system, a partial frequency multiplexing manner used by the wireless communication system, a resource unit type supported by the wireless communication system, a service type scheduled by the wireless communication system, and a configuration of extended subframes in the wireless communication system; wherein the resource unit type comprises one of the following and the combination thereof: a localized resource unit and a distributed resource unit.

2. The method according to claim 1, wherein the processes at least comprise multi-cell resource mapping and cell-specific resource mapping, wherein the multi-cell resource mapping is to perform permutation operation on a physical resource unit and map the permuted physical resource unit to one or more frequency partitions, and the cell-specific resource mapping is to permute the resource unit in each frequency partition to a localized resource unit, or a distributed resource unit, or a localized resource unit and a distributed resource unit.

3. The method according to claim 1, wherein, that the parameters in the processes are different refers to one of the following and the combination thereof: the unit of permutation operation in the sub-channelization and resource mapping being different, a permutation sequence in the sub-channelization and resource mapping being different, a partitioning of frequency partitions in the sub-channelization and resource mapping being different, localized resource regions, or distributed resource regions, or localized resource regions and distributed resource regions in the sub-channelization and resource mapping being different, and the number of the bits indicating the process of resource mapping being different.

4. A method for sub-channelization and resource mapping of wireless resources, comprising:

according to functional features, or scheduling features, or functional features and scheduling features of a frame or a subframe in a frame structure of a wireless communication system, determining a process of sub-channelization and resource mapping of wireless resources or parameters of the process, so that the frame or subframe with different functional features, or different scheduling features, or different functional features and scheduling features has different process of sub-channelization and resource mapping or different parameters of the process;

wherein the functional features of the frame or subframe comprise one of the following and the combination thereof: whether the frame or subframe comprise a superframe header, or a synchronous channel, or a superframe header and a synchronous channel, whether the frame or subframe needs to simultaneously provide services to multiple wireless communication systems, and whether the frame or subframe comprises control channels; the scheduling features of the frame or subframe comprise one of the following and the combination thereof: a frequency multiplexing manner used by the frame or subframe, a partial frequency multiplexing manner used by the frame or subframe, a resource unit type used by the frame or subframe, a service type scheduled by the frame or subframe, and whether the subframe is an extended subframe.

5. The method according to claim 4, wherein the process at least comprises a first resource mapping and a second resource mapping, wherein the first resource mapping performs permutation operation on a physical resource unit and maps the permuted physical resource unit to one or more frequency partitions, and the second resource mapping permutes the resource unit in each frequency partition to a localized resource unit, or a distributed resource unit, or a localized resource unit and a distributed resource unit.

6. The method according to claim 4, wherein, that the parameters in the process are different refers to one of the following and the combination thereof: the unit of permutation operation in the sub-channelization and resource mapping being different, permutation sequence in the sub-channelization and resource mapping being different, partitioning of frequency partitions in the sub-channelization and resource mapping being different, and localized resource regions, or distributed resource regions, or localized resource regions and distributed resource regions in the sub-channelization and resource mapping being different.

7. A method for sub-channelization and resource mapping of wireless resources, comprising:

dividing wireless resources on a bandwidth of a wireless communication system into multiple physical resource units, performing a permutation operation on the multiple physical resource units with N physical resource units as a unit, and mapping the permuted physical resource units to one or more frequency partitions, wherein different frequency partitions independently select a value of N;

wherein the method further comprises:

determining the value of N according to bandwidth features occupied by the wireless communication system, or according to scheduling features, or according to the bandwidth features and scheduling features, wherein determining the value of N according to the bandwidth features occupied by the wireless communication system, or according to the scheduling features specifically comprises: setting a predetermined value set, selecting the value of N from the predetermined value set according to the bandwidth features occupied by the wireless communication system or scheduling features, and performing the sub-channelization and resource mapping according to the value of N; or predetermining the value of N; and wherein the method further comprises:

after determining the value of N according to the bandwidth features occupied by the wireless communication system, or according to scheduling features, or according to the bandwidth features and scheduling features, notifying a terminal of the value of N via a broadcast channel; or, notifying the terminal of the bandwidth features occupied by the wireless communication system or the scheduling features and the predetermined value set, and the terminal selecting the value of N from the predetermined value set according to the bandwidth features occupied by the wireless communication system or the scheduling features.

8. The method according to claim 7, wherein the scheduling features comprise one of the following and the combination thereof: a frequency multiplexing manner used by the wireless communication system, a partial frequency multiplexing manner used by the wireless communication system, a resource unit type supported by the wireless communication system, a service type scheduled by the wireless communication system, a configuration of an extended subframe in the wireless communication system, a configuration of a control channel in the wireless communication system, and whether the wireless communication system needs to provide services to multiple wireless communication systems simultaneously.

\* \* \* \* \*